US005700538A

United States Patent [19]
Davis et al.

[11] Patent Number: 5,700,538
[45] Date of Patent: *Dec. 23, 1997

[54] MINERAL FILLED EPDM MEMBRANE COMPOSITIONS WITH IMPROVED ADHESION PERFORMANCE

[75] Inventors: James A. Davis, Indianapolis, Ind.; Jeffrey W. Henegar, Kentwood, Mich.; William F. Barham, Jr., Prescott, Ark.

[73] Assignee: Bridgestone/Firestone, Inc., Akron, Ohio

[*] Notice: The term of this patent shall not extend beyond the expiration date of Pat. No. 5,468,550.

[21] Appl. No.: 708,892

[22] Filed: Sep. 5, 1996

Related U.S. Application Data

[62] Division of Ser. No. 414,828, Mar. 31, 1995, abandoned.

[51] Int. Cl.$^6$ ............................................. B32B 7/12
[52] U.S. Cl. ........................ 428/57; 524/427; 524/445; 156/157
[58] Field of Search ................... 428/57; 156/157; 524/427, 445

[56] References Cited

U.S. PATENT DOCUMENTS

| | | | |
|---|---|---|---|
| 2,619,481 | 11/1952 | Baldwin et al. | 260/79.5 |
| 3,280,082 | 10/1966 | Natta et al. | 260/80.7 |
| 3,307,690 | 3/1967 | Bond et al. | 206/59 |
| 3,355,417 | 11/1967 | Martin | 260/41 |
| 3,650,874 | 3/1972 | Job et al. | 161/217 |
| 3,660,530 | 5/1972 | Hoblit et al. | 260/876 |
| 3,801,531 | 4/1974 | Berejka et al. | 260/33.4 PQ |
| 3,852,251 | 12/1974 | Maxey | 260/79.5 B |
| 3,867,247 | 2/1975 | O'Farrell et al. | 161/88 |
| 3,887,530 | 6/1975 | O'Farrell et al. | 260/79.3 R |
| 3,919,358 | 11/1975 | Batiuk et al. | 260/897 A |
| 3,941,859 | 3/1976 | Batiuk et al. | 260/897 B |
| 4,036,912 | 7/1977 | Stricharczuk | 260/897 A |
| 4,130,535 | 12/1978 | Coran et al. | 260/33.6 AQ |
| 4,153,589 | 5/1979 | Triolo | 260/28.5 B |
| 4,210,579 | 7/1980 | Grigo et al. | 525/88 |
| 4,212,787 | 7/1980 | Matsuda et al. | 260/33.6 AQ |
| 4,220,579 | 9/1980 | Rinehart | 260/33.6 AQ |
| 4,229,504 | 10/1980 | Brachman | 428/461 |
| 4,247,661 | 1/1981 | Herman et al. | 525/88 |
| 4,263,186 | 4/1981 | Blüemel | 260/23 H |
| 4,335,026 | 6/1982 | Balinth | 524/271 |
| 4,355,139 | 10/1982 | Coran et al. | 825/133 |
| 4,379,114 | 4/1983 | Fujki et al. | 264/248 |
| 4,404,056 | 9/1983 | Kakehi et al. | 156/244.11 |
| 4,426,468 | 1/1984 | Omum et al. | 523/166 |
| 4,435,466 | 3/1984 | Kuhnel et al. | 428/215 |
| 4,438,228 | 3/1984 | Schenck | 524/109 |
| 4,480,012 | 10/1984 | Fieldhouse | 428/506 |
| 4,480,065 | 10/1984 | Kawai et al. | 524/418 |
| 4,501,842 | 2/1985 | Chmiel et al. | 524/432 |
| 4,514,442 | 4/1985 | Crepeau | 427/140 |
| 4,537,825 | 8/1985 | Yardley | 428/327 |
| 4,539,344 | 9/1985 | Van Ornum et al. | 523/166 |
| 4,581,092 | 4/1986 | Westley | 156/306.9 |
| 4,588,637 | 5/1986 | Chiu | 428/355 |
| 4,589,804 | 5/1986 | Paeglis et al. | 405/270 |
| 4,599,258 | 7/1986 | Hageman | 428/140 |
| 4,601,935 | 7/1986 | Metcalf et al. | 428/57 |
| 4,603,164 | 7/1986 | Chmiel et al. | 524/432 |
| 4,645,793 | 2/1987 | Von Hellens et al. | 524/518 |
| 4,657,958 | 4/1987 | Fieldhouse, et al. | 524/247 |
| 4,687,810 | 8/1987 | Coran | 585/74 |
| 4,732,925 | 3/1988 | Davis | 524/426 |
| 4,742,119 | 5/1988 | Close | 525/211 |
| 4,767,658 | 8/1988 | Lorenz | 428/192 |
| 4,778,852 | 10/1988 | Futamura | 525/97 |
| 4,801,639 | 1/1989 | Hoshi et al. | 524/112 |
| 4,803,020 | 2/1989 | Valaitis et al. | 264/22 |

(List continued on next page.)

FOREIGN PATENT DOCUMENTS

| | | | |
|---|---|---|---|
| 0 484 872 A3 | 11/1991 | European Pat. Off. | C08J 3/24 |
| 0 528 296 A1 | 2/1993 | European Pat. Off. | E04D 5/14 |
| 0 545 196 A1 | 6/1993 | European Pat. Off. | E04D 5/06 |
| 2 310 379 | 4/1976 | France | C08L 23/10 |

OTHER PUBLICATIONS

"Rubber, vulcanized—Determination of tear strength (trouser, angle and crescent test pieces)", International Standard (ISO) 34, 8 pages (Dec. 1979).

"Minium Requirements for Non-Reinforced Black EPDM Rubber Sheets for Use in Roofing Applications", American National Standard—The RMA Roofing Products Division, 6 pp. (Dec./1990).

"Rubber-Thermoplastic Compositions. Part V. Selecting Polymers for Thermoplastic Vulcanizates*", by Coran et al., *Rubber Chemistry and Technology*, vol. 55, pp. 116–136 (Dec. 1981).

"UL 790—Standard for Tests for Fire Resistance of Roof Covering Materials", Fifth Edition, Underwriters Laboratories Inc., 19 pages, (Oct. 1983).

*Primary Examiner*—Alexander Thomas
*Attorney, Agent, or Firm*—Frank J. Troy, Sr.

[57] ABSTRACT

Vulcanizable elastomeric roof sheet materials for roofing having improved adhesion performance and prepared from a polymeric composition of matter comprising at least one polymer selected from the group consisting of polyolefins prepared from monomers containing at least two carbon atoms and mixtures thereof, the polymer having a crystallinity of up to about 2 percent by weight; about 20 to 125 parts by weight of one or more mineral fillers per 100 parts of the polymer, about 50 to 110 parts by weight of one or more black-type fillers per 100 parts of the polymer; and from about 50 to 70 parts by weight of a processing material per 100 parts of the polymer and having improved peel adhesion to itself using commercially available bonding and lap- splice adhesives. A method of covering a roof comprises the steps of applying layers of vulcanizable elastomeric roof sheet material prepared from a vulcanizable polymeric composition of matter, to the roof being covered; overlapping adjacent edges of the layers; and adhesively seaming the overlapped edges of the layers together to form an acceptable seam. The composition of matter is devoid of any flame retardant rubber chemical additives, heavy metals, oxidants and halogen-containing polymers.

14 Claims, No Drawings

U.S. PATENT DOCUMENTS

| | | | |
|---|---|---|---|
| 4,833,194 | 5/1989 | Kuan et al. | 524/525 |
| 4,839,412 | 6/1989 | Harrell et al. | 524/436 |
| 4,845,145 | 7/1989 | Hazelton et al. | 524/426 |
| 4,851,463 | 7/1989 | Opsahl et al. | 524/109 |
| 4,855,172 | 8/1989 | Chiu | 428/57 |
| 4,855,362 | 8/1989 | Muse, Jr. et al. | 525/194 |
| 4,881,996 | 11/1989 | Nussbaum et al. | 156/157 |
| 4,894,408 | 1/1990 | Hazelton et al. | 524/425 |
| 4,897,137 | 1/1990 | Miller et al. | 156/157 |
| 4,912,148 | 3/1990 | Kim et al. | 524/487 |
| 4,918,127 | 4/1990 | Adur et al. | 524/415 |
| 4,944,818 | 7/1990 | Dybsky et al. | 156/71 |
| 4,985,502 | 1/1991 | Izumi et al. | 525/194 |
| 4,990,568 | 2/1991 | Benefield et al. | 525/232 |
| 4,994,328 | 2/1991 | Cogliano | 428/489 |
| 5,000,361 | 3/1991 | Briddell et al. | 222/575 |
| 5,051,477 | 9/1991 | Yu et al. | 525/194 |
| 5,070,111 | 12/1991 | Dumbauld | 521/82 |
| 5,073,597 | 12/1991 | Puydak et al. | 525/193 |
| 5,084,119 | 1/1992 | Barksdale | 156/157 |
| 5,086,121 | 2/1992 | Hazelton et al. | 525/197 |
| 5,095,068 | 3/1992 | Chiu | 524/525 |
| 5,126,384 | 6/1992 | Davis et al. | 524/71 |
| 5,130,355 | 7/1992 | Hergenrother et al. | 524/71 |
| 5,206,305 | 4/1993 | Tojo et al. | 525/331.7 |
| 5,216,066 | 6/1993 | Sandstrom et al. | 524/495 |
| 5,232,531 | 8/1993 | Dammann et al. | 156/157 |
| 5,234,987 | 8/1993 | Hubbard et al. | 524/505 |
| 5,242,727 | 9/1993 | Briddell et al. | 428/42 |
| 5,256,228 | 10/1993 | Davis et al. | 156/157 |
| 5,286,798 | 2/1994 | Davis et al. | 525/211 |
| 5,468,550 | 11/1995 | Davis et al. | 428/327 |
| 5,512,118 | 4/1996 | Davis et al. | 156/157 |

MINERAL FILLED EPDM MEMBRANE COMPOSITIONS WITH IMPROVED ADHESION PERFORMANCE

CROSS-REFERENCE OF RELATED APPLICATIONS

This application is a divisional application of U.S. application Ser. No. 08/414,828 filed Mar. 31, 1995, abandoned.

TECHNICAL FIELD

The present invention relates generally to sheeting material used for roofing. More particularly, the present invention relates to heat seamable sheeting material which exhibits improved adhesion performance. Specifically, the sheeting material comprises mineral fillers such as soft and hard clays, chemically modified clays, calcium carbonate, titanium dioxide, silicon dioxide and the like and elastomers such as ethylene-propylene-diene terpolymer, referred to herein as EPDM, ethylene-propylene rubber, referred to herein as EPM, ethylene-butene copolymer or similar olefinic-type polymers, and mixtures thereof. The elastomers are amorphous rather than crystalline or semi-crystalline; however, blends of amorphous and semi-crystalline polymers may have utility in this invention. A method is also provided for covering the roofs of buildings which includes the step of employing the sheeting material of the present invention.

BACKGROUND OF THE INVENTION

Ethylene-propylene copolymers (EPM) and ethylene-propylene-diene terpolymers (EPDM) are extensively utilized in a variety of applications. A particular application wherein EPM and EPDM are preferred because of their excellent physical properties, weathering and heat aging resistance, is in rubber sheeting, such as roofing, agricultural pond liners and water distribution membranes. EPM and EPDM sheeting materials usually are prepared by compounding the EPM, EPDM or mixtures thereof with the appropriate fillers, plasticizers, antidegradants, etc. in a suitable internal mixer, and calendering the resulting compound into the desired sheet rubber.

Because of outstanding weathering resistance and flexibility, cured elastomeric roof sheeting has been rapidly gaining acceptance. This material normally is prepared by vulcanizing the composition in the presence of sulfur or sulfur containing compounds such as mercaptans. An earlier U.S. Pat. No. 4,803,020 also teaches the use of radiation crosslinking promoters in an EPDM sheeting composition which can be cured by ionizing radiation. Vulcanization and curing can be done in the presence of other compounds as well. For example, ethylene-butene copolymers may be cured in the presence of a triazine or organic peroxide.

Notwithstanding the usefulness of radiation curing, sulfur curing, and triazine curing, a disadvantage of utilizing these elastomers is the lack of adhesion of these elastomers, especially cured olefinic elastomers to themselves. This is a serious problem because in applying elastomeric sheets to a roof, it is usually necessary to seam the cured elastomeric sheets together. This splice or seam area is subjected to both short-term and long-term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions. Suffice to say, it is necessary that the adhesion of the roofing membrane to itself be considered in order to develop good seams.

Therefore, elimination of the need to employ more expensive crystalline and semi-crystalline elastomers would be advantageous. Also, a need for elastomeric roofing material with improved adhesion performance continues to exist. Moreover, the elastomeric roof sheeting materials of the present invention are also devoid of additives that traditionally are employed to impart flame and burn resistivity. Generally, in order to improve flame resistivity of the product using the olefinic elastomers, fillers such as antimony trioxide, decabromo diphenyl oxide (DBDPO), dechlorane (chlorinated allcyclic hydrocarbon), alumina trihydrate, and chlorinated or brominated paraffins, are normally incorporated into the composition as shown in U.S. Pat. Nos. 4,839,412 and 4,851,463. No halogen-containing rubber chemical additives, heavy metals, oxidants, halogen-containing polymers or the like are present in the roofing membrane compositions of the present invention.

SUMMARY OF THE INVENTION

It is thus an object of the present invention to provide vulcanizable elastomeric roof sheeting materials that possess improved adhesion performance.

It is another object of the present invention to provide vulcanizable elastomeric roof sheeting materials that are environmentally friendly in that they do not contain any oxidants, heavy metals or halogen-containing rubber chemical additives and mixtures thereof.

It is yet another object of the present invention to provide vulcanizable elastomeric roof sheeting materials that possess improved adhesion performance in applications where an improvement in burn resistivity is desired.

It is still another object of the present invention to provide vulcanizable elastomeric roof sheeting materials that exhibit superior long-term heat aging, ozone and weathering resistance.

It is yet another object of the present invention to provide vulcanizable elastomeric roof sheeting materials that possess improved dimensional stability.

It is yet another object of the present invention to provide vulcanizable elastomeric roof sheeting materials that possess unaged and heat aged physical properties that exceed the requirements of the Rubber Manufacturers Association for unreinforced black EPDM membranes used in roofing applications.

It is still another object of the present invention to provide a method for covering roofs which employs vulcanizable elastomeric roof sheeting materials possessing improved adhesion performance in low slope uses.

In general, the present invention relates to vulcanizable elastomeric roof sheet materials for roofing having improved adhesion performance and prepared from a vulcanizable polymeric composition of matter comprising at least one polymer selected from the group consisting of polyolefins prepared from monomers containing at least 2 carbon atoms and mixtures thereof; about 20 to 125 parts by weight of one or more mineral fillers per 100 parts of the polymer; about 50 to 110 parts by weight of one or more black-type fillers per 100 parts of said polymer; and from about 50 to 70 parts by weight of a processing material, per 100 parts of the polymer, the composition of matter being devoid of flame retardant rubber chemical additives, oxidants, heavy metals and halogen-containing polymers and having improved peel adhesion to itself using an adhesive selected from the group consisting of neoprene-based adhesives and butyl-based adhesives.

A method for covering a roof is also provided and comprises the steps of applying layers of a vulcanizable elastomeric roof sheet material prepared from a polymeric composition of matter to the roof being covered; overlapping adjacent edges of the layers; and adhesively seaming the overlapped edges of the layers together to form an acceptable seam, the composition of matter being devoid of flame retardant rubber chemical additives, heavy metals, oxidants, and halogen-containing polymers and having improved peel adhesion to itself using an adhesive selected from the group consisting of neoprene-based adhesives and butyl-based adhesives.

At least one or more of the foregoing objects' which shall become apparent to those skilled in the art are described in greater detail with reference to the specification which follows.

PREFERRED EMBODIMENT OF THE INVENTION

As noted hereinabove, the roof sheeting materials of the present invention comprise EPDM and EPM. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082 and the disclosure of which is incorporated herein by reference. The preferred polymers have from about 50 to about 70 weight percent ethylene and from about zero to about 10 weight percent diene with the balance of the polymer being propylene or some other similar olefin-type polymer. Also, the polymers are amorphous which results from having a crystallinity of from zero up to about two percent by weight as determined using DSC technique. Accordingly, crystalline and semi-crystalline EPDM and EPM polymers are not required for practice of the present invention, however, blends of amorphous and semi-crystalline crystalline EPDM and EPM may be used to practice this invention, provided the resulting blend of polymers does not exceed about 2 percent by weight crystallinity as determined by DSC techniques.

Semi-crystalline and crystalline EPDM and EPM materials are generally defined as those having at least two percent crystallinity and higher, up to about 13 percent by weight, as is known in the art. Where these materials have higher crystallinity than the amorphous EPDM and EPM materials, it is within the present invention to utilize blends with the amorphous materials. Relative amounts of the amorphous and crystalline materials can be varied although the amorphous component will comprise the majority, that is, usually at least 80 percent by weight of the 100 percent amount of EPDM or EPM material. When blends are employed, they should be compounded in relative amounts taking into account their crystallinity in order that the EPDM and/or EPM blend has a crystallinity of less than or up to about two percent by weight, in keeping with the preferred use of amorphous polymer materials.

To be useful in such polymer blends, according to the present invention, the EPDM will have at least about 2 weight percent crystalinity, from the ethylene component; an $\overline{Mn}$ as measured by GPC of at least about 30,000 and an $\overline{Mw}$, as measured by GPC of at least about 100,000. Similarly, the EPR should have at least about 2 weight percent crystallinity (ethylene); and $\overline{Mn}$, as measured by GPC of at least about 30,000 and an $\overline{Mw}$, as measured by GPC of at least about 100,000.

The diene monomer utilized in forming the EPDM terpolymer is preferably a non-conjugated diene. Illustrative examples of non-conjugated dienes which may be employed are dicyclopentadiene; alkyldicyclopentadiene; 1,4-pentadiene; 1,4-hexadiene; 1,5-hexadiene; 1,4-heptadiene; 2-methyl-1,5-hexadiene; cyclooctadiene; 1,4-octadiene; 1,7-octadiene; 5-ethylidene-2-norbornene; 5-n-propylidene-2-norbornene; 5-(2-methyl-2-butenyl)-2-norbornene and the like. Moreover, the preferred EPDM rubbers have from about zero to about 10 weight percent unsaturation.

Preferably, when a least two EPDM terpolymers are utilized to prepare the membrane composition, one of the polymers should have a weight average molecular weight of a least 200,000. The second EPDM terpolymer should have a weight average molecular weight from about 100,000 to about 200,000. If only one EPDM terpolymer is employed to develop the membrane composition, the polymer should have a weight average molecular weight of at least 150,000, and more preferably, a weight average molecular weight of 150,000 to 300,000.

The preferred EPDM rubbers suitable for use in this invention generally have an ethylene content from about 50 to 70 weight percent and from about zero to 10 weight percent diene (third monomer) with the balance of the polymer being propylene or some other similar olefin-type polymer. The viscosity of the preferred EPDM terpolymers should range from about 25 to about 55 Mooney units ($ML_4$ at 125° C.) and the glass transition temperature (Tg) of from about −40° C. to about −60° C., and more preferably from about −45° C. to about −55° C. In addition, although any EPDM rubber can be used in the polymer blend, preferred EPDM rubbers are amorphous or non-crystalline so as to provide for improved processability, especially during the calendering process. Generally, preferred EPDM rubbers include those EPDM's having less than two percent by weight crystallinity as determined by DSC technique. In some instances, blends of major amounts of amorphous EPDM rubbers and minor amounts of crystalline EPDM rubbers may be used and may be preferred in this invention.

Particularly useful and preferred in preparing the EPDM portion of the polymer blend for use in the membrane compound composition are EPDM rubbers commercially available from DSM Copolymer of Baton Rouge, La., under the trademark Keltan®; Exxon Chemical Company of Houston, Tex., under the trademark Vistalon®; Uniroyal Chemical Company of Naugatuck, Conn., under the trademark Royalene®, Miles Inc. (Polysar Rubber Division) under the trademark Polysar EPDM®; and E.I. DuPont de Nemours of Wilmington, Del., under the trademark Nordel®.

EPDM rubbers which are available from the above polymer suppliers are sulfur vulcanizable and have an ethylene content, a polymer viscosity, and a glass transition temperature, as noted hereinabove for preferred EPDM's.

More particularly, some suitable sulfur vulcanizable EPDM rubbers used to practice this invention include those which have a weight average molecular weight of at least about 200,000. Several examples of such EPDM rubbers include Royalene® 535, Royalene® 3180, Royalene® 580HT; Keltan® 4506, Keltan® 4906, Keltan® 5206, Keltan® DE-296, Polysar EPDM® 826X, Nordel® 1145 and Nordel® 1660. A few of the main functions of the these EPDM rubbers are to provide high tensile strength and improved tear resistance as well as impart needed green strength to the membrane composition during the manufacturing process.

More particularly, a higher molecular weight EPDM terpolymer may be blended with an EPDM terpolymer which has a weight average molecular weight of about 100,000 to about 200,00. Commercially available EPDM terpolymers which have the desired weight average molecular weight ranging from about 100,000 to about 200,000 include, for example, Royalene® 501, Royalene® 521, Royalene® 3399, Keltan® 378, Keltan® 2308, and Keltan® 2506. The primary function of the lower molecular weight EPDM terpolymer is to reduce the overall viscosity of the membrane compound as well as to impart sufficient tack and smoothness to the calendered sheet.

Accordingly, if the EPDM terpolymer does not possess inherent low viscosity, it can be blended with one or more lower viscosity EPDM terpolymers which are known to those skilled in the art and within the scope of the present invention. Where the viscosity is satisfactory for processing, no blending of the polymers is required, but may be employed for other reasons such as cost, availability, physical properties and the like.

More specifically, where a blend of EPDM rubbers are employed, they are preferably employed in amounts ranging from about 50 to about 95 parts by weight of the first EPDM (weight average molecular weight of at least about 200,000), and from about 5 to 50 parts by weight of the second EPDM (weight average molecular weight from about 100,00 to about 200,000), to total 100 parts by weight of the polymer blend. Where amounts of the two EPDM rubbers are not equal, it is preferred that the EPDM rubber having the higher weight average molecular weight be employed in the greater amount. Also, wherein the membrane compound viscosity is satisfactory for processing, no blending of the polymers may be necessary.

The term EPM is used in the sense of its definition as found in ASTM D-1418-85 and is intended to mean a copolymer of ethylene and propylene. The preferred copolymers contain from about 55 to 70 weight percent ethylene with the balance to total 100 weight percent being propylene. As noted hereinabove, it is within the scope of the present invention to blend minor amounts of low Mooney EPDM terpolymers with major amounts of high Mooney EPDM terpolymers to reduce the overall viscosity of the membrane compound.

Also, useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having a $\overline{Mw}$, as measured by GPC of at least about 221,000. Other similar olefinic polymers (e.g., ethylene/octene copolymer) can be used to practice this invention. For purposes of discussion herein, references to polymers is intended to include any of the EPDM, EPM or similar olefinic polymers of the present invention. As noted hereinabove, it is within the scope of the present invention also to blend low Mooney EPDM terpolymers with the olefinic polymers disclosed herein to reduce the overall viscosity of the membrane compound.

The composition of the membrane compound employed to form the roof sheeting material comprises 100 parts by weight of EPDM, EPM, or other similar olefinic type copolymers, including mixtures thereof, to which are added mineral fillers as a partial replacement for traditionally used carbon black fillers, and processing materials as well as optionally other components, all of which are discussed hereinbelow.

With respect first to the mineral fillers, suitable fillers are selected from the group comprising of hard clays, soft clays, chemically modified clays, mica, talc, calcium carbonate, titanium dioxide, amorphous precipitated hydrated silica and mixtures thereof. These fillers may partially replace "black" fillers, i.e. carbon black and other related petroleum-derived materials.

Some four basic types of clays are normally used as reinforcing fillers for rubber elastomers. The different types of clay fillers include; airfloated, water washed, calcined and surface treated or chemically modified.

The airfloated clays are the least expensive and most widely used. They are divided into two general groups, hard and soft, and offer a wide range of reinforcement and loading possibilities. Hard clays are used in the amount of about 25 parts to about 125 parts per 100 parts of polymer (phr) by weight, preferably in an amount from about 25 to 110 phr. In order to maintain equivalent compound hardness, 1.5 to 1.75 phr hard clay is used to replace 1 phr of carbon black in preparing sulfur cured EPDM roof sheeting. Any commercially available hard clay may be used. The preferred airfloated hard clays used are: Suprex®, Barden R®; LGB® all commercially available from J. M. Huber Corporation.

The airfloated soft clays are used in the amount of about 25 parts to about 125 parts per 100 parts of polymer (phr), preferably in an amount of about 65 phr. Again, in order to maintain equivalent compound hardness, 1.5 to 1.75 phr soft clay is used to replace 1 phr of carbon black in preparing sulfur cured EPDM roof sheeting. The preferred airfloated soft clays used are Paragon®; and K-78® commercially available from J.M. Huber Corporation and Hi-White R® clay from Evans Clay.

Water washed clays are normally considered as semi-reinforcing fillers. This particular class of clays are more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB, all are commercially available from J.M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J.M Huber Corporation.

The final type of clay includes the chemically modified reinforcing clays. Cross-linking ability is imparted to the clay by modifying the surface of the individual particles with a polyfunctional silane coupling agent. Chemically modified clays are used in the amount of about 25 parts to about 110 parts per 100 parts of polymer (phr), preferably in an amount of about 65 phr. In an effort to achieve equivalent compound hardness, about 1.5 phr of chemically modified clay is used to replace 1 phr carbon black in preparing sulfur cured EPDM roof sheeting. Normally the specific gravity of most clays is about 2.60 at 25° C. The preferred chemically modified clays are commercially available from J.M. Huber Corporation and include: Nucap® 100, Nucap® 200, Nucap® 190, Nucap® 290, Nulok® 321, Nulok® 390 and Polyfil® 368.

Other useful non-black mineral fillers include amorphous silica (silicon dioxide). Silicas are generally classed as wet-process, hydrated, silicas because they are produced by a chemical reaction in water, from which they are precipitated as ultrafine, spherical particles. Silica can be employed in the amount of about 20 parts to about 75 parts per 100 parts of polymer (phr), preferably in an amount from about 20 to 50 phr. The useful upper range is limited by the high viscosity imparted by fillers of this type. Some of the commercially available silicas which may be used include: Hi-Sil® 215, Hi-Sil® 233, Hi-Sil® EP and Silene® D all produced by PPG Industries. Also, a number of useful commercial grades of different silicas are available from J.M. Huber Corporation.

Finely ground calcium carbonate is employed in the amount of about 20 parts to about 200 parts per 100 parts of polymer (phr), preferably in an amount from about 35 to 125 phr. In order to maintain equivalent compound hardness the replacement ratio for calcium carbonate to carbon black is about 2:1. Calcium carbonate generally has a specific gravity of about 2.71 and is commercially available from a number of suppliers including Harwick Chemical, J.M. Huber Corporation, Georgia Marble, Genstar Stone Products and Omya, Inc.

Titanium dioxide is employed in the amount of about 5 parts to about 100 parts per 100 parts of polymer (phr), preferably in an amount from about 10 to 60 phr. Both the rutile and anatase form of titanium dioxide may be used, however, the rutile form is preferred and includes such products as TiPure® R-960, which is a fine, white powder having a specific gravity of 3.90 and commercially available from DuPont de Nemours of Wilmington, Del.

Other commercially available non-black mineral fillers that may be employed to practice this invention include and talc (magnesium silicate), mica (mixtures of sodium and potassium aluminum silicate). Alumina trihydrate can also be used as a flame retardant and smoke suppressant in vulcanizable EPDM roof sheeting.

Other suitable fillers are selected from the group consisting of reinforcing materials, and mixtures thereof, as are customarily added to rubber. Examples include such materials as carbon black, ground coal, cryogenically ground rubber and the like. Generally, preferred black-type fillers include carbon black, ground coal and cryogenically ground rubber.

Carbon black is used in an amount of about 20 parts to about 150 parts per 100 parts of polymer (phr), preferably in an amount of about 50 to about 110 phr. The preferred range of carbon black herein (50 to 110 phr) is about equal to the amount of carbon black normally used in preparing sulfur cured EPDM roof sheeting. The carbon black useful herein is any conventional carbon black. Preferred are furnace blacks such as GPF (general-purpose furnace), FEF (fast-extrusion furnace) and SRF (semi-reinforcing furnace). Also, small amounts of a reinforcing carbon black, i.e. HAF (high-abrasion furnace) may have utility in this invention.

The ground coal employed as a filler in the compositions of the invention is a dry, finely divided black powder derived from a low volatile bituminous coal. Ground coal has a particle size ranging from a minimum of 0.26 microns to a maximum of 2.55 microns with the average particle size of 0.69±0.46 as determined on 50 individual particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.253+0.03, an ash content of 4.80 weight % and a sulfur content of 0.75 weight %. Austin Black is commercially available from Coal Fillers, Inc., P.O. Box 1063, Bluefield, Va. Amounts range from about 10 to 35 phr with about 10 to 20 phr being preferred. Use of ground coal is optional and an attendant reduction in the amount of carbon black can be made to compensate.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of about 1.129±0.015 and a particle size ranging from about 30 to about 300 microns with an average particle size ranging from about 50 to about 80 microns. Amounts may range from about 5 to 40 phr with about 10 to 25 phr being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts thereof fall within the range of amounts normally employed in preparing sulfur cured conventional EPDM roof sheeting.

With respect to the processing oil, it is included to improve the processing behavior of the membrane composition (i.e. reduce mixing time and increase calendering rate). The processing oil is included in an amount ranging from about 20 parts to about 105 parts by weight of process oil per 100 parts of elastomer component, preferably in an amount ranging from about 50 parts to about 70 parts by weight. Preferred processing oils are a paraffinic oil, e.g. Sunpar 2280 which is available from the Sun Oil Company. Other petroleum derived oils including naphthenic oils may be used.

Curing of the EPDM membrane compounds when used in the compositions of the invention can be effected by any of the well known curing systems, including sulfur and sulfur-donor cure systems, peroxide cure systems, and quinone-type cure systems. Curing of the EPM rubbers, when used in the compositions of this invention, can generally be effected with a peroxide cure system.

As noted, the sulfur and sulfur-containing cure systems used in the present invention typically include one or more sulfur cure accelerators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N,N-diphenylguanadine, N,N-di-(2-methylphenyl)-guanadine, thiazole accelerators such as 2-mercaptobenzothiazole, 2-(morpholinodithio) benzothiazole disulfide, zinc 2-mercaptobenzothiazole and the like; dithiocarbamates accelerators such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate and zinc dimethyldithiocarbamate.

It should be appreciated that the foregoing list is not exclusive, and that other vulcanizing agents known in the art to be effective in the curing of EPDM terpolymers employed in the polymer blend may also be utilized. For a list of additional vulcanizing agents, see The Vanderbilt Rubber Handbook, RT Vanderbilt Co., Norwalk Conn. 06855 (1990). It should also be understood that these sulfur donor-type accelerators may be used in place of the elemental sulfur or in conjunction therewith. Suitable amounts of sulfur to be used in the cure package can be readily determined by those skilled in the art, and generally range from about 0.25 to 2.0 phr, while the amount of accelerator can also be readily determined by those skilled in the art and generally range from about 1.5 to about 8 phr.

Accelerators generally require a metal oxide, i.e., zinc oxide for cure activation in most all types of rubbers. Zinc oxide is almost always the metal oxide of choice because of its effectiveness and lack of toxicity. The amount of zinc oxide may vary, but about 1 to about 10 parts by weight in the formulation have been found to give the desired effect. Also, in order to initiate the vulcanization process, a small amount (generally about 1 to 2 parts by weight) of stearic acid is present in the composition. Using heat, both zinc oxide and stearic acid act as cure activators in the presence of sulfur, one or more accelerators and unsaturated rubber to help promote the formation of sulfur crosslinks during the vulcanization process. Some of the initial chemical reactions which take place during the early stages of the vulcanization process include reacting zinc oxide with stearic acid to form salts of even greater vulcanization activity. Zinc oxide itself acts as a cure activator or vulcanization promoter, speeding the rate of reaction of elemental sulfur with the unsaturation in the diene portion of the ethylene-propylene rubber. In addition to its use as a curing component, the sulfur component of the present invention may also be used in conjunction with zinc oxide to improve the heat aging resistance of the rubber composition.

Sulfur donor-type accelerators may be used in place of elemental sulfur or in conjunction with elemental sulfur if desired. Suitable amounts of sulfur and/or sulfur donor-type compounds can be readily determined by those of ordinary skill in the art and generally range from about 1 to about 4 phr. The amounts of sulfur vulcanization accelerator can also be readily determined by those of ordinary skill in the art and generally range from about 1.5 to about 8 phr.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoyl) peroxide, phenylacetyl peroxide, and the like. Suitable amounts of peroxide crosslinking agents can be readily determined by those having ordinary skill in the art and generally range from about 1 to about 6 phr.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and the like.

Examples of polysulfide activators for the quinone-type co-curing agents include calcium polysulfide, sodium polysulfide, as well as organic polysulfides having the general formula R—(S)$_x$—R, wherein R is a hydrocarbon group and x is a number from 2–4. Examples of organic polysulfides are disclosed in U.S. Pat. No. 2,619,481.

Conventional radiation equipment and techniques can also be employed in the practice of this invention. Suitable ionizing crosslinking promoters which can be used include: liquid high-vinyl 1,2-polybutadiene resins containing 90 percent 1,2-vinyl content; Sartomer SR-206 (ethylene glycol dimethacrylate), Di-Cup R (dicumyl peroxide, about 98 percent active), and Pental A (pentaerythritol resin prepared from tall oil). Preferably, these rubber chemical additives can be included in an amount of from about 1.5 to about 20 phr. Such rubber chemical additives should be compatible with the other ingredients in the composition and function to reduce the dosage of ionizing radiation needed to obtain the desired level of crosslinking.

The compositions of this invention can be compounded with various conventional additives as desired, including process and extender oils; processing aids such as various metal salts of stearic acid, sodium dodecyl sulfate as well as tackifying resins, plasticizers, antioxidants, antiozonants, waxes, cure accelerators, zinc oxide, stearic acid, UV stabilizers and the like. Such additives can be utilized in amounts conventionally employed in such rubber compounds.

The membrane compositions of this invention can also be prepared by conventional means using conventional rubber processing equipment such as a Brabender, Banbury, Sigma-blade mixer, two-roll mill, or other mixers suitable for forming viscous, relatively uniform admixtures. Mixing techniques depend on a variety of factors such as the specific types of polymers used, and the fillers, processing oils, waxes and other ingredients used. The ingredients can be added together in a single shot, loaded with the fillers, oils, etc. going in first and the polymer going in last, or in a more conventional manner with the polymer added first, depending on the actual ingredients used.

Mixing cycles generally range from about 3 to 6 minutes. Better mixing is generally attained by an incremental procedure in which part of the fillers are added first with little or no oil, with the remaining fillers and oil being added in additional increments and the polymer being added last. Rapid mixing and good dispersion can also be achieved by adding part of the EPM or EPDM on top of the fillers, plasticizers, etc. This procedure can be further modified by withholding part of the oil which is then added incrementally.

The cure package (sulfur/accelerator) is typically added near the end of the mixing cycle and at lower temperatures to prevent premature crosslinking of the EPDM composition. When utilizing a type B Banbury internal mixer, in a preferred mode, the dry or powdery materials such as the non-black mineral fillers (i.e., untreated clay, treated clays, talc, mica, and the like) of the present invention are added first, followed by the liquid process oil and finally the polymer (this type of mixing can be referred to as an upside-down mixing technique).

Two-stage mixing can be employed when better filler dispersion is desired. The rubbery composition can then be formed into a sheet via calendering. The compositions of the invention can also be formed into various types of articles using other techniques such as extrusion.

The resulting admixture is sheeted to thickness ranging from 5 to 200 mils, preferably from 35 to 60 mils by conventional sheeting methods, for example, milling, calendering or extrusion. Preferably, the admixture is sheeted to at least 40 mils (0.040-inches thick) which is the minimum thickness specified in manufacturing standards established by the Roofing Council of the Rubber Manufacturers Association (RMA) for non-reinforced EPDM rubber sheets used in roofing applications. In many cases, the admixture is sheeted to a thickness of 40-45 mils, since this is the thickness for a large percentage of "single-ply" roofing membranes used commercially. The sheeting can be visually inspected and cut to the desired length and width dimensions after curing.

The method of the present invention is practiced by utilizing an elastomeric sheet material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention.

The overlapping edges of the roofing membranes can be cleaned with soap and water or the appropriate solvent to remove any grease, oil or other contaminants which could interfere with providing adequate adhesion, and/or may be solvent cleaned as desired, to enhance bond formation and increase peel strength. Typical solvents used for cleaning the overlapped edges of the roofing membrane include hexane, heptane, or toluene, however, solvent cleaning is generally not required. Where a bonding adhesive is used, one example suitable for use with this invention is BA-2004, a neoprene-based adhesive commercially available from Firestone Building Products Company and where a lap-splice seam adhesive is used, one example suitable for use with this invention is Firestone's SA-1065, a commercially available butyl-based lap-splice adhesive. Application of the adhesive can be facilitated by spray, brush, swab or other means known in the art.

In order to demonstrate the practice of this invention, adhesive-coated membrane compositions, listed in Table I, were prepared and seams were formed by bonding together conventional EPDM sheet material with plywood or aluminum plates as well as to itself using BA-2004 bonding adhesive. Also, a number of seams were exposed to various aging times and temperatures, before being subjected to peel adhesion tests, the results of which are provided in Tables II-X. The membrane compound compositions exemplified hereinbelow are submitted for the purpose of further illustrating the nature of the present invention and are not to be considered as a limitation on the scope thereof. For each membrane composition, three peel tests were conducted and the results averaged. Peel adhesion test values are reported in pounds per linear inch (pli).

The following examples in Table I represent EPDM rubber membrane compositions with improved adhesion performance which are based upon EPDM terpolymers and are submitted for the purpose of further illustrating the nature of the present invention and are not to be considered as a limitation on the scope thereof. Parts of each ingredient are by weight, unless otherwise specified. Example No. 1 is a conventional sulfur cured black EPDM membrane of the prior art. Examples 2-4 contain an untreated clay filler and coal filler, to impart improved peel adhesion.

TABLE I

EPDM MEMBRANE COMPOSITIONS

| EXAMPLE NO. | 1 | 2 | 3 | 4 |
|---|---|---|---|---|
| EPDM Rubber[a] | 100 | 58.22 | 58.22 | 80 |
| EPDM Rubber[b] | — | 41.78 | 41.78 | 20 |
| N-650 HiStr GPF black | 137 | 91.07 | 91.07 | 91.07 |
| Austin black (Coal filler) | — | 13.93 | 13.93 | 13.93 |
| Mistron vapor talc | — | 13.93 | — | — |
| Air floated clay | — | 51.07 | 65 | 65 |
| Paraffinic process oil | 96 | 60 | 60 | 60 |
| Zinc oxide | 2.50 | 3 | 3 | 3 |
| Stearic acid | 1 | 1.25 | 1.25 | 1.25 |
| Sulfur | 0.90 | 0.85 | 0.85 | 0.85 |
| Cure package | 3.90 | 3.55 | 3.55 | 3.33 |
| TOTAL | 341.30 | 338.65 | 338.65 | 338.33 |

[a]Weight average molecular weight; from at least about 200,000
[b]Weight average molecular weight; from about 100,000 to about 200,000

The foregoing conventional EPDM rubber membrane control, Example 1, and Examples 2-4 were next subjected to comparative peel adhesion testing by bonding cured sheets of two layers of cured conventional EPDM membrane to aluminum plates, plywood and to itself using BA-2004 bonding adhesive. Also, several peel adhesion test samples were prepared using the overlapped edges of cured EPDM sheet material bonded to itself using SA-1065, a commercially available butyl-based lap-splice adhesive. The procedure employed is set forth next, followed by the adhesion test results in Tables II-X.

Detailed Peel Adhesion Test Procedure

Each of the above mineral filled black EPDM membrane compounds were subjected to testing which necessitated the building of adhesion test pads comprising 6 by 9-inch sheets of black EPDM roofing membrane, according to the following procedure.

1. A number of 6 by 9-inch, uncleaned sheets of sulfur-cured, factory produced conventional black EPDM membrane of approximately 45 mills in thickness were adhesive coated with either a layer of commercially available solvent-based bonding adhesive (neoprene-based) or lap-splice adhesive (butyl based). Also, bonding adhesive was applied to a number of one-inch wide by 6-inch long strips of plywood (quarter-inch thick) and aluminum plates (27 mils thick). The adhesive-coated membranes and adhesive-coated strips of plywood and aluminum plates were allowed to air-dry at room temperature for at least 30 minutes before assembling the adhesion test pads.

2. The peel adhesion test samples were prepared by firmly securing by hand a three-inch wide strip of adhesive-coated black EPDM membrane to a second piece of adhesive-coated black EPDM membrane. Also, samples of the bonding adhesive-coated black EPDM membrane were firmly secured by hand to strips of bonding adhesive-coated plywood and aluminum plates.

3. Each test assembly was individually mated by rolling a 2.75-inch wide, 15 pound metal roller in a back and forth motion at least four times over the surface of the seam. The test assemblies were then aged an additional 30 minutes at room temperature prior to aging.

4. A clicker machine with a one-inch wide die was utilized to prepare a number of rubber-to-rubber test specimens for peel adhesion testing.

5. The one-inch wide specimens were aged for either 24-hours or seven days at either 23° C., 70° C., 100° C. or 116° C. prior to testing, and then each were tested at the same temperature or, in several test situations where specimens were aged at 70° C., 100° C. or 116° C. were tested after being allowed to equilibrate at 23° C. for at least 30 minutes prior to testing.

6. Testing machine: Table Model 4301 Instron Universal Tester- The Instron 4301 testing machine utilizes a screw drive which provides a constant rate-of-jaw separation. Sample securement was achieved through the use of pneumatic clamps which provide 200 psi force to combat slippage of the test specimen during actual testing.

7. The one-inch wide specimens were tested at the rate (both crosshead and chart speed) of two-inches per minute using the adhesion test method set forth in ASTM D-413 (machine method). Peel adhesion seam strength was determined at room temperature (i.e., 23° C.) as well as at 70° C.

8. Adhesion strength is defined as:

Peel adhesion strength (lbs./inch)=pounds force/sample width

Examples 1–4 prepared from the membrane compositions of Table I are listed in Table II–X as Examples 1–4 hereinbelow. Table II shows a comparison of peel adhesion properties obtained on the mineral filler-free conventional black EPDM membrane control (Example 1) and the mineral filler containing black EPDM membrane compositions (Examples 2–4) of this invention.

In Table II, the surface of each EPDM membrane composition (Examples 1–4) was scrubbed with hexane and allowed to air-dry for 30 minutes before coating the surface of the membrane with bonding adhesive; the seams were formed by hand and the test samples were aged for seven days at 23° C. and then tested at 23° C.

TABLE II

| MEMBRANE ADHESION TO ITSELF USING BONDING ADHESIVE | | | | |
|---|---|---|---|---|
| TEST SAMPLE NO. | 1 | 2 | 3 | AVERAGE |
| Example No. 1 | 2.33 | 3.11 | 3.57 | 3.00 pli |
| Example No. 2 | 8.96 | 6.52 | 8.27 | 7.92 pli |
| Example No. 3 | 8.26 | 6.94 | 8.06 | 7.75 pli |
| Example No. 4 | 6.34 | 6.06 | 6.78 | 6.39 pli |

In Table III, the surfaces of the EPDM membrane compositions and aluminum plates (about 27 mils thick) were untreated before coating the surface of each membrane and aluminum plate with bonding adhesive; after 30 minutes air-drying the adhesive-coated membrane was applied to the adhesive-coated aluminum plate and the seam formed by hand. The test samples were aged for 7 days at 23° C. and then tested at 23° C.

TABLE III

| MEMBRANE ADHESION TO ALUMINUM PLATES USING BONDING ADHESIVE | | | | |
|---|---|---|---|---|
| TEST SAMPLE NO. | 1 | 2 | 3 | AVERAGE |
| Example No. 1 | 0.65 | 0.60 | 0.56 | 0.604 pli |
| Example No. 2 | 1.82 | 2.55 | 2.51 | 2.30 pli |
| Example No. 3 | 1.61 | 2.30 | 1.26 | 1.72 pli |
| Example No. 4 | 1.97 | 2.16 | 1.95 | 2.03 pli |

Table IV, the surfaces of the EPDM membrane compositions were scrubbed with hexane and allowed to air-dry for 30 minutes before coating the surface of each membrane with bonding adhesive. The untreated plywood plaque (0.25-inch thick) was coated with a layer of bonding adhesive; after 30 minutes air-drying the adhesive-coated membrane was applied to the adhesive-coated plywood plaque and the seam formed by hand. The test samples were aged for 7 days at 23° C. and then tested at 23° C.

TABLE IV

| MEMBRANE ADHESION TO PLYWOOD, USING BONDING ADHESIVE | | | | |
|---|---|---|---|---|
| TEST SAMPLE NO. | 1 | 2 | 3 | AVERAGE |
| Example No. 1 | 5.77 | 5.66 | 8.84 | 6.76 pli |
| Example No. 2 | 12.17 | 11.75 | 12.24 | 12.05 |
| Example No. 3 | 8.99 | 9.91 | 11.38 | 10.09 pli |
| Example No. 4 | 9.46 | 9.89 | 9.96 | 9.77 pli |

In Table V, the surface of each membrane composition was scrubbed with hexane and allowed to air-dry for 30 minutes before coating the surface of each membrane with lap-splice adhesive. After air-drying the adhesive-coated membranes, the seams were formed by hand. The test samples were aged for 24 hours at 23° C. and then tested at 23° C.

TABLE V

| MEMBRANE ADHESION TO ITSELF USING LAP-SPLICE ADHESIVE | | | | |
|---|---|---|---|---|
| TEST SAMPLE NO. | 1 | 2 | 3 | AVERAGE |
| Example No. 1 | 4.9 | 4.25 | 5.44 | 4.86 pli |
| Example No. 2 | 6.79 | 7.04 | 6.39 | 6.7 pli |
| Example No. 3 | 6.18 | 6.16 | 6.43 | 6.26 pli |
| Example No. 4 | 5.83 | 6.34 | 5.91 | 6.03 pli |

In Table VI, the surface of each membrane composition was scrubbed with hexane, allowed to air-dry for 30 minutes, before coating the surface of each membrane with lap-splice adhesive. After allowing the adhesive-coated membranes to air-dry for 30 minutes, the seams were formed by hand. The test samples were aged for 7 days at 70° C. and then tested at 70° C.

TABLE VI

| MEMBRANE ADHESION TO ITSELF USING LAP-SPLICE ADHESIVE | | | | |
|---|---|---|---|---|
| TEST SAMPLE NO. | 1 | 2 | 3 | AVERAGE |
| Example No. 1 | 1.41 | 1.53 | 1.93 | 1.63 pli |
| Example No. 2 | 1.89 | 1.97 | N/A | 1.93 pli |
| Example No. 3 | 1.62 | 1.72 | 1.82 | 1.71 pli |
| Example No. 4 | 1.49 | 1.87 | 1.76 | 1.71 pli |

In Table VII, the surface of each membrane composition was scrubbed with hexane, allowed to air-dry for 30 minutes and adhesive-coated with lap-splice adhesive. After allowing the adhesive-coated membranes to air-dry for 30 minutes, the seams were formed by hand. The test samples were aged for 7 days at 70° C. and then tested at 70° C.

TABLE VII

MEMBRANE ADHESION TO ITSELF USING LAP-SPLICE ADHESIVE

| TEST SAMPLE NO. | 1 | 2 | 3 | AVERAGE |
|---|---|---|---|---|
| Example No. 1 | 1.96 | 1.39 | 1.33 | 1.55 pli |
| Example No. 2 | 1.83 | 2.14 | 1.83 | 1.93 pli |
| Example No. 3 | 1.98 | 2.01 | 1.55 | 1.85 pli |
| Example No. 4 | 1.91 | 1.96 | 1.80 | 1.89 pli |

In Table VIII, the surface of each membrane composition was scrubbed with hexane, allowed to air-dry for 30 minutes and adhesive-coated with lap-splice adhesive. After allowing the adhesive-coated membranes to air-dry 30 minutes, the seams were formed by hand. The test samples were aged for 7 days in water and then tested at 23° C.

TABLE VIII

MEMBRANE ADHESION TO ITSELF USING LAP-SPLICE ADHESIVE

| TEST SAMPLE NO. | 1 | 2 | 3 | AVERAGE |
|---|---|---|---|---|
| Example No. 1 | 8.03 | 9.16 | 8.37 | 8.52 pli |
| Example No. 2 | 8.54 | 12.24 | 11.97 | 10.92 pli |
| Example No. 3 | 8.55 | 10.0 | 11.24 | 9.93 pli |
| Example No. 4 | 9.47 | 9.73 | 10.21 | 9.80 pli |

In Table IX, the surface of each membrane was scrubbed with hexane, allowed to air-dry for 30 minutes and adhesive-coated with lap-splice adhesive. After allowing the adhesive-coated membranes to air-dry for 30 minutes, the seams were formed by hand. The test samples were aged 7 days at 100° C. and then tested at 23° C.

TABLE IX

MEMBRANE ADHESION TO ITSELF USING LAP-SPLICE ADHESIVE

| TEST SAMPLE NO. | 1 | 2 | 3 | AVERAGE |
|---|---|---|---|---|
| Example No. 1 | 5.54 | 5.76 | 4.56 | 5.29 pli |
| Example No. 2 | 5.95 | 5.8 | 6.06 | 5.94 pli |
| Example No. 3 | 5.21 | 5.34 | 5.35 | 5.31 pli |
| Example No. 4 | 5.03 | 5.47 | 5.21 | 5.24 pli |

In Table X, the surface of each membrane was scrubbed with hexane, allowed to air-dry for 30 minutes and coated with lap-splice adhesive. After allowing the adhesive-coated membrane to air-dry for 30 minutes, the seams were formed by hand. The test samples were aged for 7 days at 116° C. and then tested at 23° C.

TABLE X

MEMBRANE ADHESION TO ITSELF USING LAP-SPLICE ADHESIVE

| TEST SAMPLE NO. | 1 | 2 | 3 | AVERAGE |
|---|---|---|---|---|
| Control | 9.29 | 10.92 | 8.61 | 9.61 pli |
| Example No. 1 | 8.18 | 12.59 | 11.07 | 10.61 pli |
| Example No. 2 | 11.6 | 9.75 | 11.2 | 10.85 pli |
| Example No. 3 | 10.24 | 10.87 | 10.36 | 10.49 pli |

Summarizing, peel adhesion as shown in Table II for the sulfur cured conventional black EPDM membrane control (Example No. 1) at 23° C. was an average of 3 lbs./inch, while peel strength for the three mineral filler containing black EPDM membrane compositions (Examples Nos. 2-4) of this invention ranged from 6.39 to 7.92 lbs./inch at 23° C. using bonding adhesive. In the peel adhesion test, failure occurred at the interface of the seam. Test failures of this type are commonly referred to as adhesive failures. In Tables III and IV, the mineral filler containing black EPDM membrane compositions (Examples Nos. 2-4) developed better seam peel strength to both aluminum plates and plywood than the sulfur cured conventional black EPDM membrane control (Example No. 1) using the bonding adhesive. The sulfur cured conventional black EPDM membrane is commercially available from Firestone Building Products Company and marketed as a RUBBERGARD® roofing membrane.

In Tables V to X, the three mineral filler-containing EPDM membrane compositions (Examples Nos. 2-4) of the present invention provided better 24-hour and 7 days aged peel adhesion than the conventional black EPDM membrane control (example No. 1) using the lap-splice adhesive. The conventional EPDM membrane control comprised EPDM with only one type of carbon black and no mineral fillers or coal filler. Test samples were aged at various elevated temperatures, i.e., 23° C., 70° C., 100° C. and 116° C. and tested at either 23° C. or 70° C. The test samples listed in Tables II-X were tested at a crosshead speed in accordance with the adhesion test set forth in ASTM D-413.

In view of the properties described above, the compositions of the present invention are valuable in the production of roofing membranes. Roofing membranes formed from the compositions of the present invention may be produced by any method conventionally used for producing roofing membranes from filled polymeric compositions. For example, the membranes may be formed by a conventional calendering technique. Roofing membranes formed from the compositions of the present invention may optionally be scrim reinforced.

While a typical use for the composition of the present invention is as roofing membranes, the compositions have other utilities. In the automotive area for instance, the composition can be employed to manufacture liners and seals for doors, headlamps and lamps, wheel well liners and other applications where rubber can be applied against an metal surface or component. In addition, the composition of the present invention can be used to cover piles of wood, barns and other buildings. Another possibility for use is as a liner for canals and ponds.

In conclusion, it is to be understood that the invention is not limited to the specific types of EPDM exemplified herein or by the disclosure of other typical EPDM, EPM or other semi-crystalline olefin type polymers provided herein, the examples having been provided merely to demonstrate the practice of the subject invention. Those skilled in the art may readily select other EPDM, EPM or other similar olefin polymers including copolymers of ethylene and butene and ethylene and octene, according to the disclosure made hereinabove. It should be clear from the foregoing examples and specification disclosure that the use of amorphous EPDM terpolymers or blends of amorphous and semi-crystalline EPDM terpolymers having a combined crystallinity of up to about two weight percent can be used to prepare elastomeric roof sheet material with improved adhesion performance.

Similarly, the roof sheet material is environmentally friendly, in that, it does not contain halogen-based or halogen-containing rubber chemical additives; nor, does it contain oxides of metals, such as, antimony, mercury, lead, manganese and the like. It is to be understood that the invention is not limited to the specific types of amorphous EPDM terpolymers exemplified herein or by the disclosure of other typical olefinic elastomers provided herein, the examples having been provided merely to demonstrate the practice of the subject invention. Similarly, the invention is not necessarily limited to the particular filler, processing material and additives exemplified or the amounts thereof. Those skilled in the art may readily select other amorphous elastomers, or fillers, processing materials and the like according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A laminate seam of rubber sheet material for roofing having improved adhesion performance comprising:
   two layers of vulcanizable elastomeric roof sheet material, one of said layers at least partially overlapping the other of said layers, said roof sheet material being prepared from a polymeric composition of matter having up to about 2 weight percent crystallinity comprising:
   at least one polymer selected from the group consisting of polyolefins prepared from monomers containing at least 2 carbon atoms and mixtures thereof, said polymer having a crystallinity of up to about 2 percent by weight;
   about 20 to 125 parts by weight of one or more non-black mineral fillers per 100 parts of said polymer;
   about 50 to 110 parts by weight of one or more black-type fillers per 100 parts of said polymer;
   from about 50 to 70 parts by weight of a processing material, per 100 parts of said polymer, said composition of matter being devoid of flame retardant rubber chemical additives, heavy metals, oxidants and halogen-containing polymers; and
   a cure package; and
   an adhesive, selected from the group consisting of neoprene-based and butyl-based adhesives, interposed between the area of overlapping of said layers, said layers of roof sheet material having improved peel adhesion to each other using said adhesive.

2. A laminate seam, as set forth in claim 1, wherein said non-black mineral filler is selected from the group consisting of hard clays, soft clays, chemically modified clays, mica, talc, calcium carbonate, titanium dioxide, amorphous precipitated hydrated silica and mixtures thereof.

3. A laminate seam, as set forth in claim 2, wherein said processing material is selected from the group consisting of paraffinic oils, naphthenic oils and waxes and mixtures thereof.

4. A laminate seam, as set forth in claim 3, wherein said mineral filler comprises about 65 parts by weight of a clay and said polymeric composition of matter includes about 60 parts by weight of processing oil.

5. A laimnate seam, as set forth in claim 2, wherein said clay is chemically modified.

6. A laminate seam, as set forth in claim 2, wherein said clay is untreated.

7. A laminate seam, as set forth in claim 1, wherein said polymer further comprises a diene monomer component.

8. A laminate seam, as set forth in claim 7, wherein said polymer comprises EPDM.

9. A laminate seam, as set forth in claim 1, further comprising from about 10 to 35 parts by weight of ground coal filler per 100 parts of said polymer.

10. A laminate seam, as set forth in claim 1, further comprising at least one or more polymers forming a mixture with said at least one polyolefinic polymer, wherein said one or more polymers forming said mixture are selected from the group consisting of polyolefins prepared from monomers containing at least 2 carbon atoms and have a crystallinity of at least about 2 percent by weight, and wherein said mixture is blended in relative proportions so that the overall crystallinity thereof does not exceed about 2 percent by weight.

11. A laminate seam, as set forth in claim 1, wherein said adhesive is selected from the group consisting of bonding adhesives and lap-splice adhesives.

12. A laminate seam, as set forth in claim 11, wherein said adhesive is a bonding adhesive and said layers of roof sheet material have a peel adhesion seam strength of at least 6.39 pounds/inch upon aging 7 days at 23° C. using said bonding adhesive.

13. A laminate seam, as set forth in claim 11, wherein said adhesive is a lap-splice adhesive and said layers of roof sheet material have a peel adhesion seam strength of at least 6.03 pounds/inch upon aging 7 days at 70° C. using said lap-splice adhesive.

14. A laminate seam, as set forth in claim 1, wherein said cure package includes sulfur and at least one sulfur cure accelerators.

* * * * *